United States Patent [19]

Moorhouse

[11] Patent Number: 4,648,655

[45] Date of Patent: Mar. 10, 1987

[54] VEHICLE SEATS

[75] Inventor: David Moorhouse, Towcester, England

[73] Assignee: jmh Holdings Limited, Northampton, England

[21] Appl. No.: 777,318

[22] Filed: Sep. 18, 1985

[30] Foreign Application Priority Data

Sep. 28, 1984 [GB] United Kingdom ............... 8424609

[51] Int. Cl.$^4$ .............................................. B60N 1/08
[52] U.S. Cl. .................................... 297/331; 297/308; 248/584; 248/222.4
[58] Field of Search ............... 297/331, 332, 334, 336, 297/379; 248/408, 407, 562, 564, 573, 595, 222.4, 420, 222.1; 211/192

[56] References Cited

U.S. PATENT DOCUMENTS

| | | | |
|---|---|---|---|
| 2,717,717 | 9/1955 | Busch | 248/222.4 X |
| 2,829,703 | 4/1958 | Knoedler | 248/584 X |
| 3,317,167 | 5/1967 | Becker et al. | 248/222.4 X |
| 3,347,510 | 10/1967 | Buyken | 248/222.4 X |
| 3,480,324 | 11/1969 | Bauer et al. | 297/308 |
| 3,519,240 | 7/1970 | Swenson | 248/573 |
| 3,572,828 | 3/1971 | Lehner | 248/584 X |
| 4,008,919 | 2/1977 | Muraishi | 297/331 |
| 4,105,245 | 8/1978 | Simons et al. | 297/379 X |
| 4,257,647 | 3/1981 | Gianessi | 297/336 |
| 4,561,621 | 12/1985 | Hill | 248/423 X |

*Primary Examiner*—Peter A. Aschenbrenner
*Attorney, Agent, or Firm*—Leydig, Voit & Mayer

[57] ABSTRACT

A tractor seat of the type having a seat pan 14 which is hooked on to a vertically movable spring biassed carriage 12, so that the seat pan can be released and moved out of the way of a standing driver, has a latch device 18 comprising a headed pin 20 secured to the pan 14 and a catch plate 22 secured to the carriage and formed with an aperture 22a for receiving the headed pin 20. The catch plate is resilient so that it can be bent away from the pin to release the seat pan. In particular the aperture tapers from the lower end normally occupied by the pin to an upper end through which the head of the pin cannot pass, so that accidental lifting of the pan will lock the headed pin within the aperture.

4 Claims, 4 Drawing Figures

VEHICLE SEATS

This invention relates to a vehicle seat, and in particular to a seat for a tractor.

It is well known in tractors to provide a seat part or pan which can be moved out of its normal position to enable the driver of the tractor to drive the vehicle while in the standing position. Such a tractor seat is described in U.S. Pat. No. 3,480,324. The danger however with a seat of this type is that if the tractor should overturn, the seat pan is liable to be moved out of its normal position by centrifugal force and throw the driver out of the seat.

If, on the other hand, a seat belt is provided on the tractor and anchored to the floor, resilient upward and downward movement of the seat pan with respect to the floor of the vehicle will cause the seat belt to become alternately tighter and looser. Alternatively, if the seat belt is attached to the seat pan, overturning of the tractor will release the seat pan from its normal position so as to move away from the floor of the vehicle, and the driver will move with the seat pan and be liable to injury due to contact with the tractor cab frame or other parts of the tractor.

According to the present invention there is provided a vehicle seat comprising a support member upstanding from a base, a carriage movable upwardly and downwardly on the support member and biassed upwardly by a spring, a seat part, a pivot arm device pivotally connected to the seat part and to the base and a hooked coupling device secured to the back of the seat part and engaged over coupling members on the carriage but detachable therefrom to enable the seat part to be released from the carriage and lifted out of the way of a driver seeking to drive the vehicle in a standing position, wherein a latch is provided which in its locked position prevents accidental release of the hooked coupling device from the carriage but which can be moved against a return spring force to a release position to enable the seat part to be detached from the carriage.

In particular, the latch can comprise a headed pin member and a catch plate member having an aperture therein, one of said members of the latch being secured to the seat pan and the other to the carriage, one of said members being movable resiliently in a direction along the shank of the pin to disengage the headed pin from the plate. Preferably the catch plate member is secured to the carriage and is sufficiently flexible to be bent resiliently out of the path of movement of the pin.

The invention will now be particularly described with reference to the accompanying drawings, in which.

Figure 1:
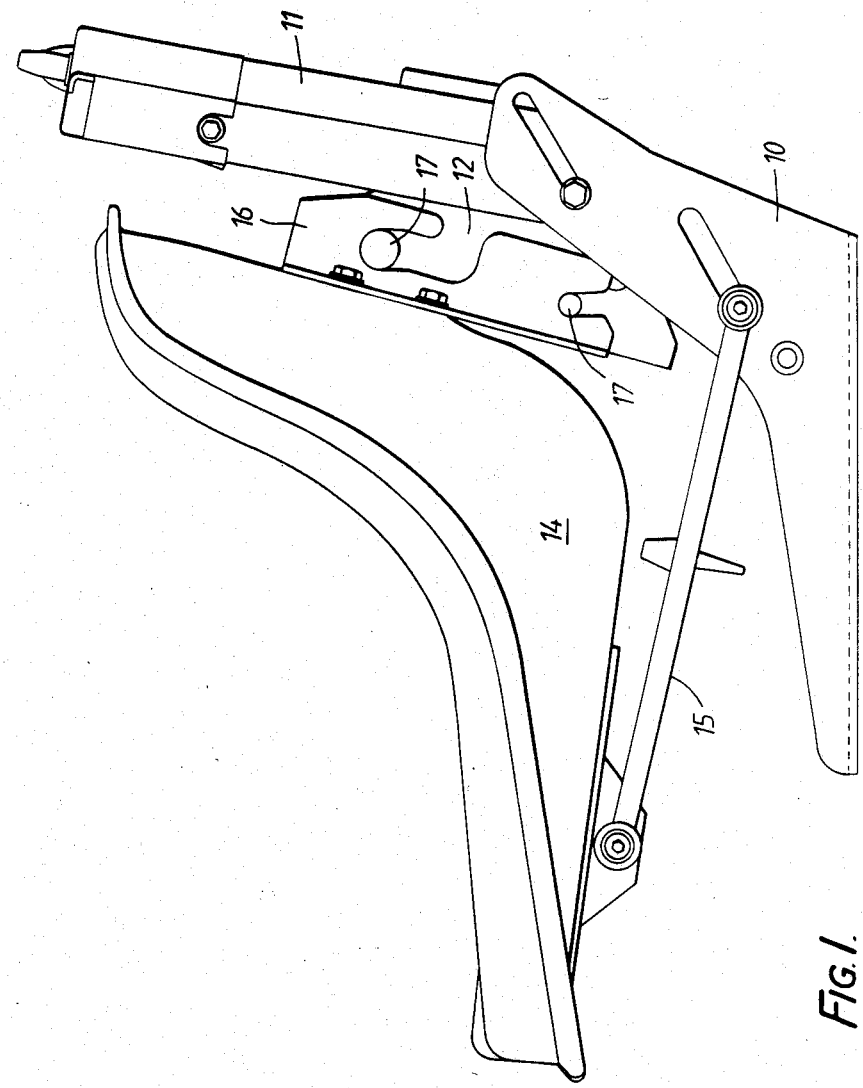
FIG. 1 is a side elevation of a tractor seat suspension of the type to which the present invention relates, incorporating a seat pan and a carriage for supporting and guiding movement of the seat pan.

As shown in FIG. 1, a tractor seat to which the present invention is applicable comprises a base 10 which is secured to the floor of the tractor, a support member 11 upstanding from the base, a carriage 12 slidably mounted on the support member and biassed upwardly by a spring (not shown), a seat pan 14, a pivot arm 15 pivotally connected to the seat pan 14 and to the base 10 and a hooked coupling device 16 secured to the back of the seat pan engageable over coupling lugs 17 on the carriage 12. By lifting the seat pan and the hooked coupling device 16, the seat pan can be detached from the carriage and lifted to a raised portion in which the seat pan is out of the way of a driver wishing to stand in a position previously occupied by the seat pan. In this raised position, the lower end of the hooked coupling device can be engaged in openings in the upper end of the support member 11 to retain the seat pan in the raised position.

Figure 2:
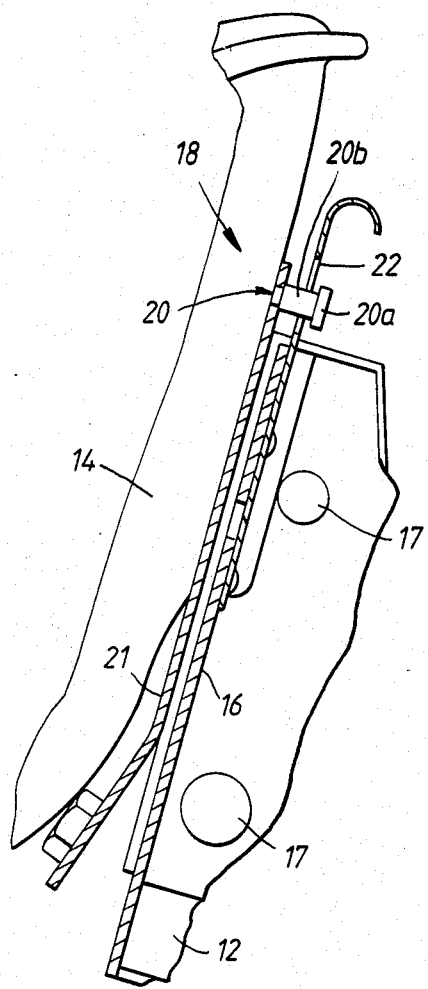
FIG. 2 is a section through part of the seat pan, and carriage of a tractor seat of the type shown in FIG. 1, showing a latch mechanism for preventing detachment of the seat pan from the carriage in the event of the tractor rolling over.
Figure 3:
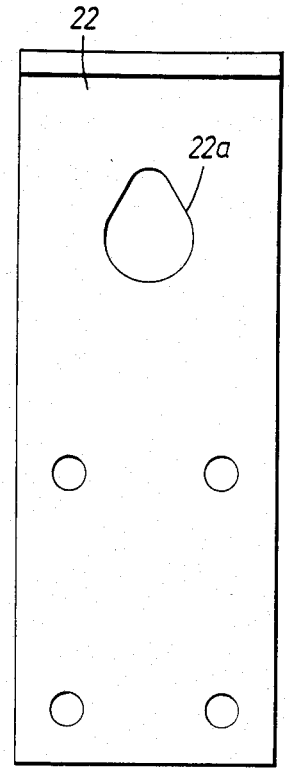
FIG. 3 is a view as seen looking from right to left in FIG. 2 of a plate forming part of the latch mechanism.
Figure 4:
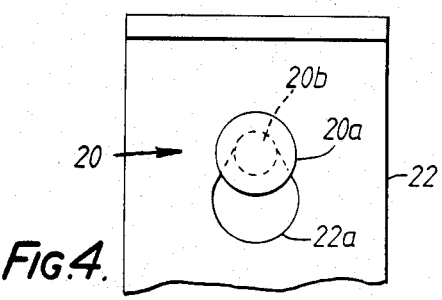
FIG. 4 is a scrap view illustrating a headed pin in locking engagement with the plate of FIG. 2.

The danger of the hooked coupling device becoming accidentally detached from the carriage in the event of the tractor rolling over is prevented by a latch mechanism 18 (see FIG. 2).

This latch mechanism comprises a headed pin 20 welded to a plate 21 which in turn is secured to the rear of the seat pan 14. In addition the latch mechanism comprises a catch plate 22, preferably of thin sheet steel to give it flexibility, which is riveted to the front wall of the carriage in particular on the rearwardly facing side of that wall.

Above the carriage, the catch plate 22 is formed with an aperture 22a which is elongate in the vertical direction. The lower end of the aperture is wide enough to enable the head 20a of the pin 20 to pass therethrough, but the aperture tapers in the upward direction so that at its upper end the aperture accommodates the shank 20b of the pin but is too narrow to enable the head of the pin to pass therethrough.

In the normal position occupied by the seat pan when the hooked coupling device 16 is engaged over the lugs 17 of the carriage, the shank of the pin 20 extends through the wide part of the aperture 22a of the catch plate with the head of the pin well spaced to the rear of the catch plate 22. If now it is desired to lift the seat pan to its raised position, the catch plate 22 is pushed rearwardly so that it flexes and allows the head 20a of the pin 20 to pass through the lower wide part of the aperture 22a in a forward direction. The seat pan is then free to be lifted to its raised position.

Upon release of the catch plate 22, it will return to its normal position in which the shank of the pin 20 lies within the aperture 22a and the head 20a of the pin extends to the rear of the aperture. If now the tractor rolls over, the seat pin 14 will tend to lift away from the carriage 12 with the result that the shank 20b of the pin 20 will move upwardly along the length of the aperture 22a in the catch plate until it reaches the narrow upper end of the aperture. In this position, no movement of the catch plate 22 (whether intentional or accidental) will release the pin from the catch plate and therefore the seat will remain locked to the carriage.

Although the seat has been described in relation to a flexible apertured plate secured to the carriage, in a modification the aperture plate could be provided on the seat pan and a resiliently movable headed pin could be provided on the carriage, for example by mounting the pin on a flexible plate.

I claim:

1. A vehicle seat comprising a support member upstanding from a base, a carriage mounted on the support member and including coupling members, a seat means, a pivot arm device pivotally connected to the seat means and to the base, a hooked coupling device secured to the back of the seat means and detachably engaging the coupling members on the carriage whereby the seat means may be detached from the carriage and pivoted at the base, and a latch operatively associated between the seat means and the carriage, said latch being movable between a locked and released position, whereby the latch in its locked position prevents accidental release of the hooked coupling device from the carriage and in its released position enables the seat means to be detached from the carriage.

2. A vehicle seat according to claim 1 wherein the latch comprises a pin member and a catch plate member having an aperture therein, one of said members of the latch being secured to the seat means and the other to the carriage, said catch plate member being movable resiliently in a direction along the shank of the pin to disengage the pin from the catch plate member.

3. A vehicle seat according to claim 2 wherein the pin includes a head and wherein the aperture is elongate in an upward and downward direction and the width of the aperture, at the end thereof to which the headed pin is moved by movement of the seat means in a sense to release it from the carriage, is insufficient to allow the head of the pin to pass therethrough.

4. A vehicle seat according to claim 2 wherein the pin is secured to the seat means, and the catch plate member is secured to the carriage, said catch plate member being sufficiently flexible to enable it to be bent resiliently to withdraw the pin from the aperture.

* * * * *